United States Patent
Krauss (10) Patent No.: US 11,628,800 B2
(45) Date of Patent: Apr. 18, 2023

(54) TENSIONER DRIVE FOR A SEATBELT INSTALLATION, AND ASSEMBLY HAVING A TENSIONER DRIVE

(71) Applicant: Joyson Safety Systems Germany GmbH, Aschaffenburg (DE)

(72) Inventor: Walter Krauss, Neu Ulm (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 0 days.

(21) Appl. No.: 17/127,559

(22) Filed: Dec. 18, 2020

(65) Prior Publication Data

US 2021/0213907 A1    Jul. 15, 2021

(30) Foreign Application Priority Data

Jan. 10, 2020   (DE) ................... 10 2020 200 264.9

(51) Int. Cl.
   B60R 22/195    (2006.01)
(52) U.S. Cl.
   CPC ...... B60R 22/1955 (2013.01); B60R 22/1952 (2013.01)
(58) Field of Classification Search
   CPC ............. B60R 22/195; B60R 22/1952; B60R 22/1954; B60R 22/1955
   See application file for complete search history.

(56) References Cited

U.S. PATENT DOCUMENTS

| | | | | |
|---|---|---|---|---|
| 5,519,997 A | * | 5/1996 | Specht ................ | B60R 22/1952 242/374 |
| 5,911,440 A | * | 6/1999 | Ruddick ............. | B60R 22/1952 280/806 |

(Continued)

FOREIGN PATENT DOCUMENTS

| | | |
|---|---|---|
| DE | 299 04 404 U1 | 8/1999 |
| DE | 696 13 127 T2 | 10/2001 |

(Continued)

OTHER PUBLICATIONS

German Examination Report dated Oct. 2, 2020 issued in a related German Patent Application No. DE 10 2020 200 264.9; filed Jan. 10, 2020 by the German Patent Office.

*Primary Examiner* — Barry Gooden, Jr.
(74) *Attorney, Agent, or Firm* — Gordon Rees Scully Mansukhani, LLP (57) ABSTRACT

The invention relates, inter alia, to a tensioner drive (11) for a seatbelt installation, having a tube (30), at least one piston (25) which within the tube (30) is displaceable along a propulsion direction (P2), and a gas generator (40) for generating a propulsion gas (G) and a propulsion pressure on a pressure-facing side of the piston (25). According to the invention it is provided that the piston (25) on the pressure-facing side thereof has a first sealing element (90) which, upon triggering the gas generator (40), is impinged with the propulsion pressure and seals a first tubular portion (31) of the tube (30) that is filled with propulsion gas (G) in relation to a second tubular portion (32) of the tube (30) that in the propulsion direction (P2) lies behind said first tubular portion (31); a second sealing element (100) which, upon triggering the gas generator (40), is separated from the first sealing element (90) is disposed in the propulsion direction (P2) behind the first sealing element (90); wherein the second sealing element (100) is displaceable relative to the (Continued)

first sealing element (90), and in the event of leakage of the first sealing element (90) and when impinged with pressure by the propulsion gas (G) is displaced along the propulsion direction (P2) while enlarging the spacing (A) between the first sealing element (90) and the second sealing element (100).

17 Claims, 10 Drawing Sheets

(56) References Cited

U.S. PATENT DOCUMENTS

| | | | |
|---|---|---|---|
| 6,113,145 A | 9/2000 | Evans | |
| 6,237,958 B1 * | 5/2001 | Patrickson | B60R 22/1952 |
| | | | 180/371 |
| 6,250,720 B1 * | 6/2001 | Wier | B60R 22/1951 |
| | | | 280/806 |
| 6,561,936 B1 | 5/2003 | Betz et al. | |
| 7,380,832 B2 * | 6/2008 | Gray | B60R 22/1955 |
| | | | 280/806 |
| 2002/0105181 A1 | 8/2002 | Specht et al. | |
| 2006/0220369 A1 * | 10/2006 | Gray | B60R 22/1955 |
| | | | 280/806 |
| 2011/0316265 A1 * | 12/2011 | Lane, Jr. | B60R 22/1955 |
| | | | 280/806 |

FOREIGN PATENT DOCUMENTS

| | | |
|---|---|---|
| DE | 101 05 500 A1 | 8/2002 |
| WO | 97/06995 A1 | 2/1997 |

* cited by examiner

TENSIONER DRIVE FOR A SEATBELT INSTALLATION, AND ASSEMBLY HAVING A TENSIONER DRIVE

The invention relates to a tensioner drive for a seatbelt installation, having a tube, at least one piston which within the tube is displaceable along a propulsion direction, and a gas generator for generating a propulsion gas and a propulsion pressure on a pressure-facing side of the piston.

A linear belt tensioner which is situated in the rear of the vehicle and is suitable for tightening a three-point seatbelt is known from publication DE 101 05 500 A1. The pyrotechnically operated belt tensioner acts on the belt webbing of the seatbelt by way of a traction element. The belt webbing is guided by a belt guide which is anchored in the vehicle superstructure.

The invention is based on the object of specifying a tensioner drive in which an undesirable discharge of propulsion gas of the gas generator of the tensioner drive can be reliably avoided in the event of a blocked tensioning procedure.

This object is achieved according to the invention by a tensioner drive having the features as claimed in patent claim 1. Advantageous design embodiments of the tensioner drive according to the invention are set forth in the dependent claims.

Accordingly, it is provided according to the invention that the piston on the pressure-facing side thereof has a first sealing element which, upon triggering the gas generator, is impinged with the propulsion pressure and seals a first tubular portion of the tube that is filled with propulsion gas in relation to a second tubular portion of the tube that in the propulsion direction lies behind said first tubular portion; a second sealing element which, upon triggering the gas generator, is separated from the propulsion gas of the gas generator by the first sealing element is disposed in the propulsion direction behind the first sealing element; wherein the second sealing element is displaceable relative to the first sealing element, and in the event of a leakage of the first sealing element and when impinged with pressure by the propulsion gas is displaced along the propulsion direction while enlarging the spacing between the first sealing element and the second sealing element.

A substantial advantage of the tensioner drive according to the invention can be seen in that in the case of the latter the second sealing element can guarantee further sealing should the first sealing element be defective or be destroyed in the event of overpressure. On account of the second sealing element being displaced relative to the first sealing element according to the invention, a dissipation of pressure of the gas pressure of the propulsion gas of the gas generator can take place in a simple manner within the tube, because the volume delimited by the first sealing element and the second sealing element is enlarged on account of the displacement of the second sealing element. On account of the volumetric enlargement and the dissipation of pressure it can be avoided in a simple manner that the second sealing element is also destroyed or starts to leak on account of the high-pressure, and the propulsion gas can subsequently escape without impediment.

It is advantageous for the first sealing element, when a predefined limit pressure which occurs in the event of a blocked movement of the piston is exceeded, is designed to leak; and upon a leakage of the first sealing element, the propulsion gas act on the second sealing element and, independently of any further movement of the first sealing element, displaces said second sealing element in the direction of the tube end of the tube.

Upon a leakage of the first sealing element, the second sealing element preferably seals the first tubular portion of the tube in relation to the second tubular portion of the tube either in a gas-tight manner or a manner that at least reduces the gas flow.

In one variant which is considered to be particularly advantageous it is provided that the piston is in at least two parts and, when viewed in the propulsion direction, has a front first piston part and, when viewed in the propulsion direction, has a second piston part that lies behind said first piston part; the first sealing element is attached to the first piston part, and the second sealing element is attached to the second piston part or per se forms the latter; and the second piston part, when viewed in the propulsion direction, is able to be moved away from the first piston part when the first piston part is blocked or decelerated in terms of the movement thereof and the second sealing element is impinged with the propulsion pressure of the propulsion gas.

In the last-mentioned embodiment it is advantageous for the first piston part and the second piston part in the initial state, prior to the triggering of the gas generator, to be connected by means of a plug connection; and for the plug connection to be released when the second piston part is moved away from the first piston part when the second sealing element is impinged with pressure.

An electrical ignition line for electrically triggering the gas generator is preferably disposed in the second tubular portion, and through a tube opening at the tube end of the tube extends to the second piston part.

The electrical ignition line in a movement of the second piston part is preferably pushed by the latter through the tube opening.

The plug connection is preferably an electrical plug connection which electrically connects the ignition line to the gas generator.

It is also considered advantageous for the gas generator to be disposed in the first piston part and to be moved conjointly with the latter; for the first piston part and the second piston part in the initial state, prior to the triggering of the gas generator, to be connected by means of a plug connection which guarantees an electrical connection between the gas generator and an electrical ignition line, and for the plug connection to be released when the second piston part is moved away from the first piston part when the second sealing element is impinged with pressure.

The tensioner drive preferably has a traction cable which is connected to the first piston part and which in a movement of the first piston part is pulled into the first tubular portion and causes a tensioning force.

The tensioner drive is preferably a linear tensioner.

The tube is preferably a rectilinear cylinder tube.

It is also advantageous for the first sealing element to be equipped with at least one predetermined breaking point so as to guarantee a defined opening action of the first sealing element and subsequently a defined displacement of the second sealing element.

The second sealing element is preferably more stable than the first sealing element so as to avoid that the second sealing element also immediately breaks or leaks before a sufficient reduction of pressure arises on account of the second sealing element being displaced when the first sealing element is opened.

A mechanical connection element which has at least one predetermined breaking point can also advantageously be present. The connection element in the initial state preferably mechanically connects at least two piston parts, in particular the first piston part and the second piston part mentioned above, to one another such that a conjoint movement of the connected piston parts takes place as long as the predetermined breaking point remains intact, wherein the connection element, upon the predetermined breaking point bursting, loses the connecting effect thereof.

It is particularly advantageous for the connection element per se to form the first sealing element and the second sealing element. The connection element is preferably configured in one part and is preferably composed of an elastically deformable material, for example rubber, plastics material, or a soft metal material.

The predetermined breaking point(s) of the connection element is/are preferably dimensioned such that said predetermined breaking points burst when the first sealing element leaks and when said predetermined breaking points are impinged with the gas pressure of the gas generator.

A deflection of the tensioner drive preferably has a roller which is preferably mounted so as to be rotatable by way of a friction bearing bush and deflect a traction cable.

The invention moreover relates to an assembly having a tensioner drive and a belt linkage point, in particular a belt deflection installation or a belt fastening point.

It is provided according to the invention that the assembly is equipped with a tensioner drive as has been described above.

In terms of the advantages and advantageous design embodiments of the assembly according to the invention reference is to be made to the above explanations in the context of the tensioner drive according to the invention and the advantageous design embodiments of the latter.

It is considered to be particularly advantageous for a traction cable of the tensioner drive in a movement of the piston to pull the belt linkage point in the direction of the tensioner drive.

The invention will be explained in more detail hereunder by means of exemplary embodiments; in the figures.

For the sake of clarity, the same reference signs are at all times used for identical or equivalent components in the figures.

Figure 1:
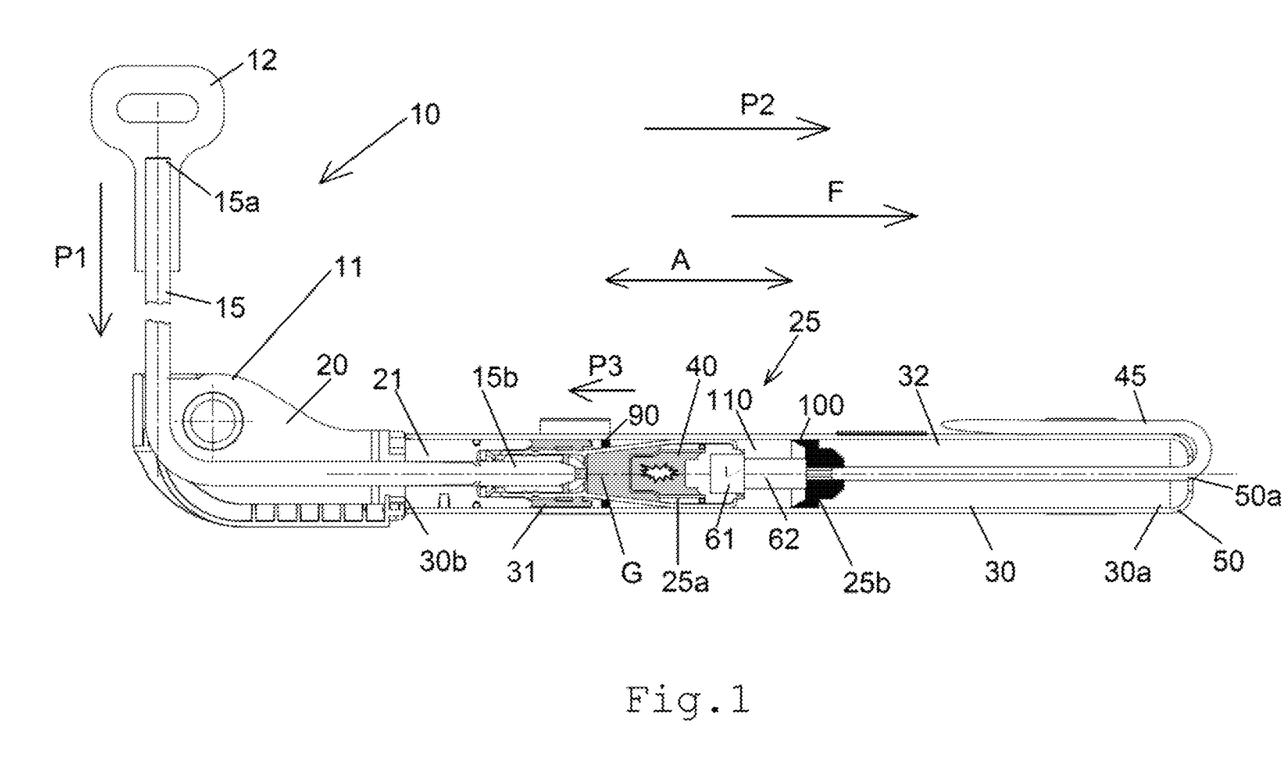
FIG. 1 shows a first exemplary embodiment for an assembly according to the invention having a first exemplary embodiment for a tensioner drive according to the invention in the fault-free case at a starting point at which a piston of the tensioner drive has not yet moved after a gas generator has been ignited.

FIG. 1 in a cross section shows a first exemplary embodiment for an assembly 10 according to the invention which comprises a tensioner drive 11 and a belt linkage point 12 in the form of a belt fastening point for the end of a seatbelt.

It is to be pointed out that the belt linkage point 12 may also be present in the form of a belt deflection installation (for example as a belt buckle).

The tensioner drive 11 has a traction cable 15 which by way of a first cable end 15a is connected to the belt linkage point 12. The traction cable 15 from the first cable end 15a extends along a direction of arrow P1 by way of a deflection 20 of the tensioner drive 11 to the other cable end 15b of said traction cable 15, or the second cable end 15b, respectively, which is fixedly connected to a piston 25. The piston 25 is situated in a tube 30 and therein is displaceable along a direction of arrow P2, hereunder also referred to as the propulsion direction P2.

FIG. 1 shows the piston 25 in an initial position, specifically upon the triggering of the tensioner drive 11, but still before a movement of the piston 25 starts.

The piston 25 is equipped with a gas generator 40 which after igniting generates a propulsion gas G which in the fault-free case, or in an envisaged tensioner operation, respectively, moves the piston 25 along the propulsion direction P2 in the direction of a tube end 30a of the tube 30 that is on the right in FIG. 1. An electrical ignition signal for electrically igniting the gas generator 40 is transmitted by way of an electrical ignition line 45 which from the right tube end 30a in FIG. 1 extends to the gas generator 40, or the piston 25, respectively.

In the exemplary embodiment according to FIG. 1, the right tube end 30a in FIG. 1 is deformed toward the inside in the peripheral region and thus forms a detent 50 for the movement of the piston 25 along the propulsion direction P2. The detent 50 is provided with an opening 50a through which the electrical ignition line 45, push-started by the piston 25, and air or gas situated therein are ejected from the tube 30 when the piston 25 moves along the propulsion direction P2 toward the right in FIG. 1. In other words, the opening 50a of the detent 50 thus forms a tube opening through which the electrical ignition line 45 in the exemplary embodiment according to FIG. 1 is ejected in a movement of the piston 25.

As has already been mentioned, FIG. 1 shows the tensioner drive 11 in a state once the gas generator 40 has been ignited and the propulsion gas G of the generator 40 has already expanded along the direction of arrow P3 in the direction of a cylindrical appendage 21 of the deflection 20. No movement of the piston 25 along the propulsion direction P2 has taken place yet in FIG. 1; the piston 25 is thus still situated in the initial position thereof.

Figure 2:
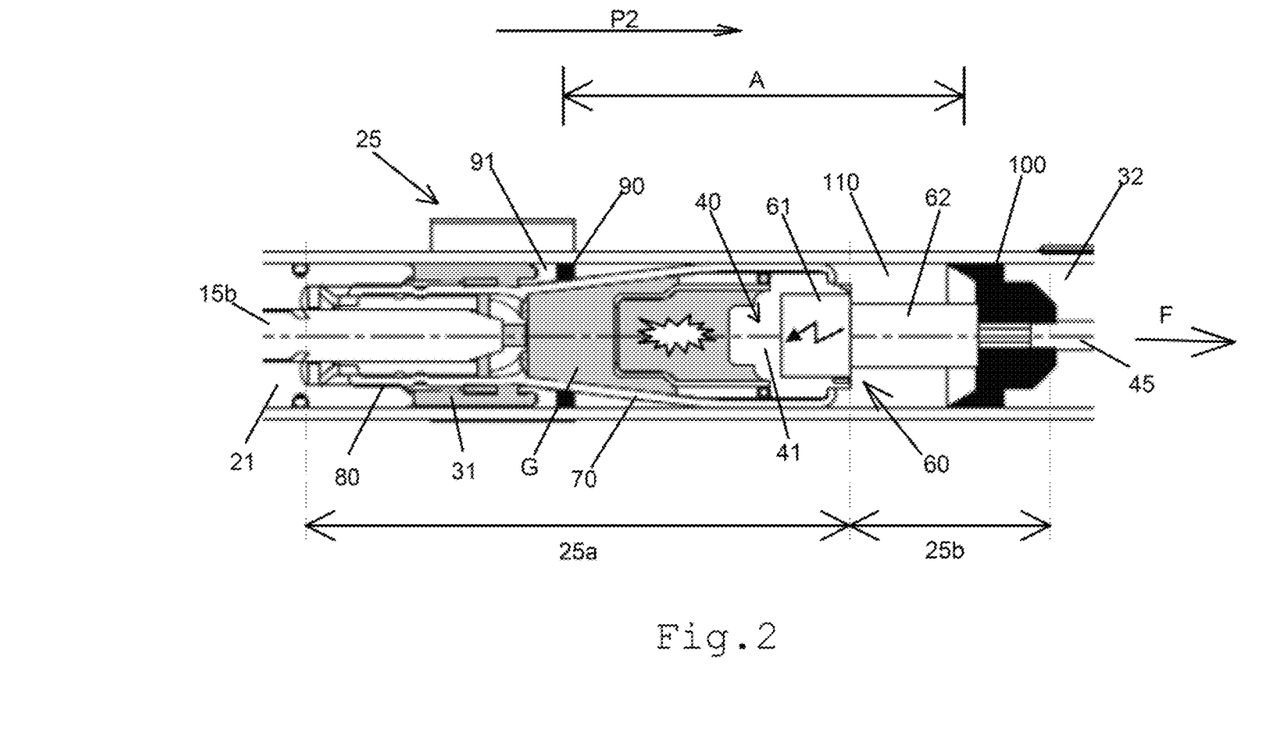
FIG. 2 shows the piston of the exemplary embodiment according to FIG. 1 in more detail.

FIG. 2 shows the piston 25 of the tensioner drive 11 according to FIG. 1 in an enlarged illustration. It can be seen that the piston 25 is constructed from two parts and has a left first piston part 25a in FIG. 2, or when viewed in the propulsion direction P2, has a front first piston part 25a respectively, and a right second piston part 25b in FIG. 2, or when viewed in the propulsion direction P2, has a second piston part 25b lying behind said first piston part 25a, respectively.

The two piston parts 25a and 25b are connected to one another, or plugged into one another, respectively, by means of a plug connection 60. The plug connection 60 in the exemplary embodiment according to FIG. 2 comprises a socket 61 in the first piston part 25*a* and a plug 62 in the second piston part 25*b*. The assignment of the socket 61 and the plug 62 to the first piston part 25*a* and the second piston part 25*b*, respectively, here is to be understood to be merely exemplary; alternatively, the socket 61 can also be assigned to the second piston part 25*b*, and the plug 62 can be assigned to the first piston part 25*a*.

The function of the plug connection 60 lies not only in guaranteeing a mechanical connection between the two piston parts 25*a* and 25*b*, but moreover to establish an electrical connection between the electrical ignition line 45 and the gas generator 40. It can thus be derived from FIG. 2 that the socket 61 is connected to an igniter 41 of the gas generator 40, said igniter 41 igniting a propelling charge 62 of the gas generator 40 when an electrical ignition signal is transmitted by way of the socket 61.

In the exemplary embodiment according to FIG. 2 the gas generator 40 is disposed in a housing 70 of the first piston part 25*a*, a clamping piece 80 of the first piston part 25*a* adjoining said housing 70. The clamping piece 80 serves for connecting the second cable end 15*b* of the traction cable 15 such that the second cable end 15*b* of the traction cable 15 in the event of a movement of the piston 25 along the propulsion direction P2 is also moved along the propulsion direction P2 and the first cable end 15*a* of the traction cable 15 is pulled downward along the direction of arrow P1 in FIG. 1.

As has already been mentioned, FIGS. 1 and 2 show the tensioner drive 11 after the gas generator 40 has been electrically ignited but before any movement of the piston 25 has taken place. The propulsion gas G of the gas generator 40 in the state according to FIG. 2 has already filled a first tubular portion 31 of the tube 30. The propulsion gas G is marked by a light grey color hue in the figures. The first tubular portion 31 extends from the cylindrical appendage 21 of the deflection 20 up to a first sealing element 90 of the piston 25 that is assigned to the first piston part 25*a*.

The first sealing element 90 in the exemplary embodiment according to FIG. 2 is supported by a mechanical support element 91 which per se does not have to have any sealing function but may readily have such a function. The first sealing element 90 seals the first tubular portion 31 of the tube 30 in relation to a second tubular portion 32 which, when viewed in the propulsion direction P2, lies behind said first tubular portion 31.

The piston 25 is moreover equipped with a second sealing element 100 which is assigned to the second piston part 25*b*. The function of the second sealing element 100, upon any potential leakage of the first sealing element 90, lies in avoiding a direct inflow of the propulsion gas G into the second tubular portion 32; for this purpose, the second sealing element 100 per se is either gas-tight or at least reduces the gas flow.

An overpressure which causes a propulsion force F on the piston 25, on account of which the piston 25 is moved along the propulsion direction P2 to the right and forms a tensioning force, is generated in the first tubular portion 31 on account of the propulsion gas G that flows into said first tubular portion 31.

As long as the first sealing element 90 remains intact and causes a sealing action of the first tubular portion 31, a chamber 110 which is free of propulsion gas G is formed within the piston 25, between the two sealing elements 90 and 100. The length of the chamber 110, or the spacing between the first sealing element 90 and the second sealing element 100, respectively, in FIG. 2 is identified by the reference sign A.

Figure 3:
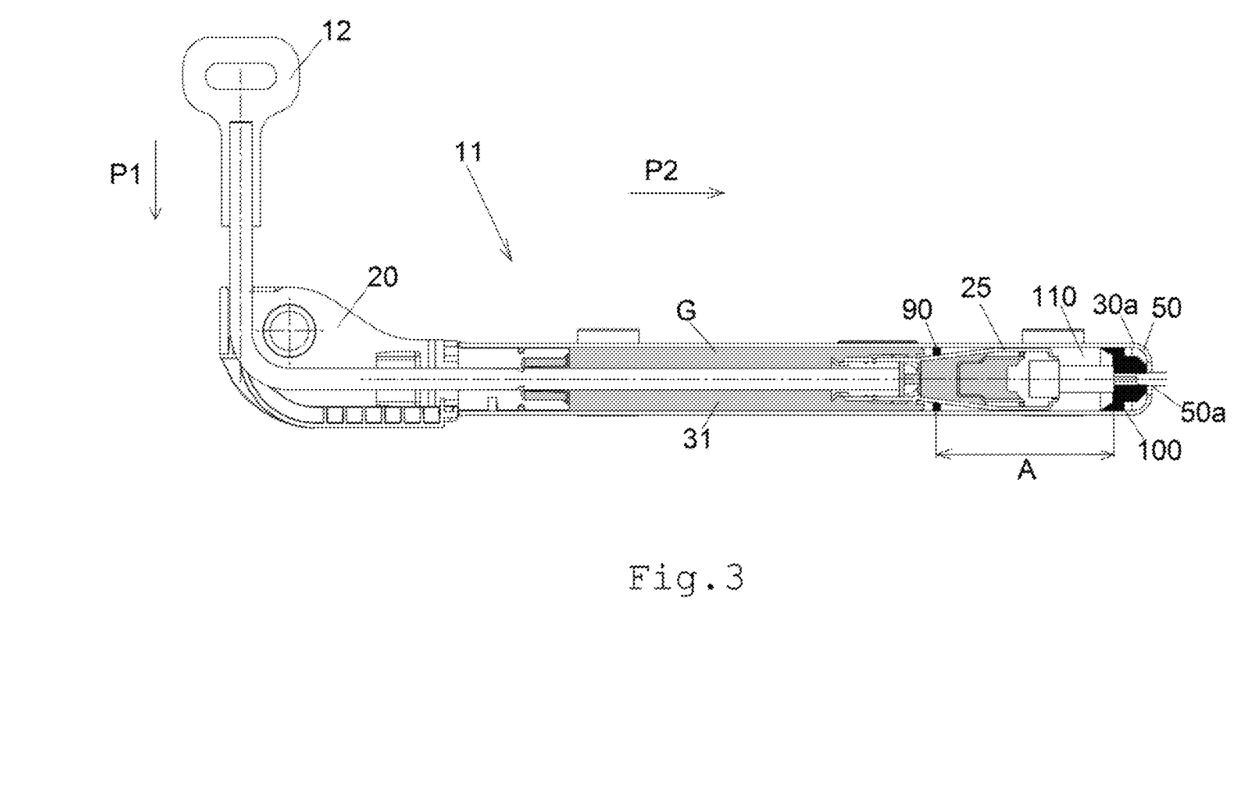
FIG. 3 shows the exemplary embodiment according to FIGS. 1 and 2 in the fault-free case at a final point at which the piston has reached the intended terminal position thereof.

FIG. 3 shows the operation of the tensioner drive 11 in the fault-free case, thus when the piston 25 has been moved from the initial position illustrated in FIGS. 1 and 2 along the propulsion direction P2 in the direction of the tube end 30*a* and has impacted the detent 50. It can be seen that the first sealing element 90 is still intact and causes the first tubular portion 31 to be sealed such that the chamber 110 within the piston 25 is free of propulsion gas G and no propulsion gas G can escape through the opening 50*a* in the detent 50.

It can moreover be seen from FIG. 3 that the spacing A between the first sealing element 90 and the second sealing element 100 remains unchanged and corresponds to the initial spacing A between the two sealing elements 90 and 100 according to FIGS. 1 and 2.

FIG. 3 moreover shows that the belt linkage point 12, by virtue of the movement of the second cable end 15*b* in the direction of the tube end 30*a*, has been pulled toward the deflection 20 of the tensioner drive 11, and thus now has a smaller spacing from said deflection 20 than in the initial state according to FIG. 1 (cf. traction direction P1 in FIGS. 1 and 3), on account of which tensioning of the belt of a seatbelt which is linked at the belt linkage point 12 and is not shown in the figures has been caused.

Figure 4:
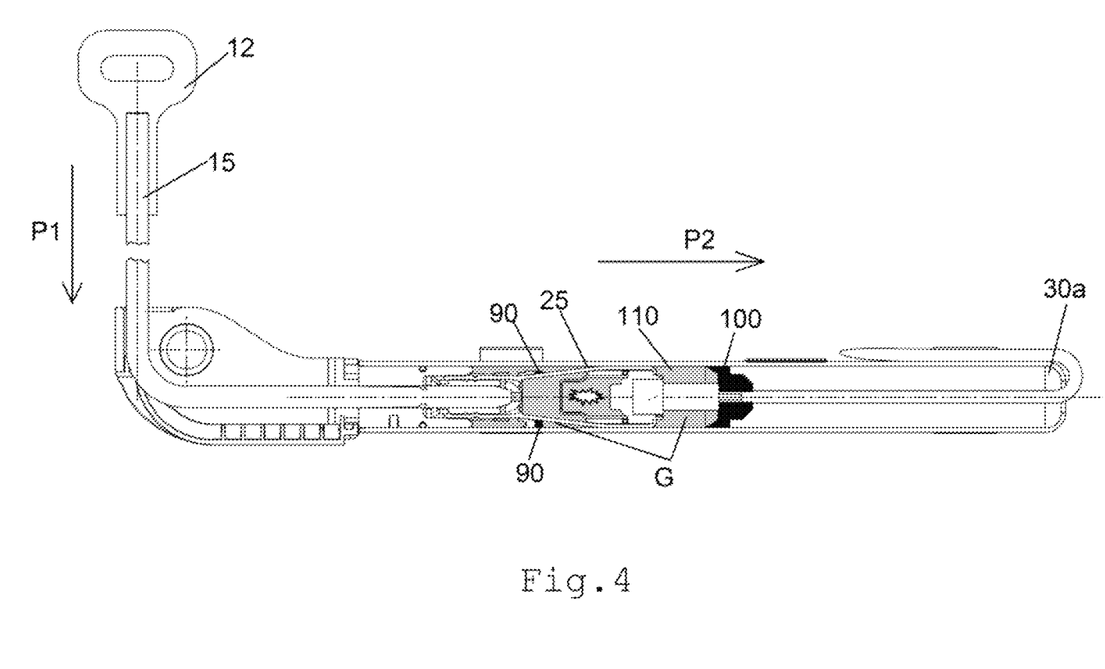
FIG. 4 shows the exemplary embodiment according to FIGS. 1 and 2 at the starting point according to FIG. 1, but in the case of a fault.

FIG. 4 shows the tensioner drive 11 according to FIG. 1 in the case of a defect, when the piston 25, as has been explained in the context of FIGS. 1 to 3, cannot be moved along the propulsion direction P1 to the tube end 30, for example because of a blockage of the traction cable 15 or of the belt linkage point 12 or of the piston 25 per se. It can be seen that the first sealing element 90 has been destroyed by virtue of the overpressure of the propulsion gas G and the chamber 110 of the piston 25 has already been filled with the propulsion gas G.

Figure 5:
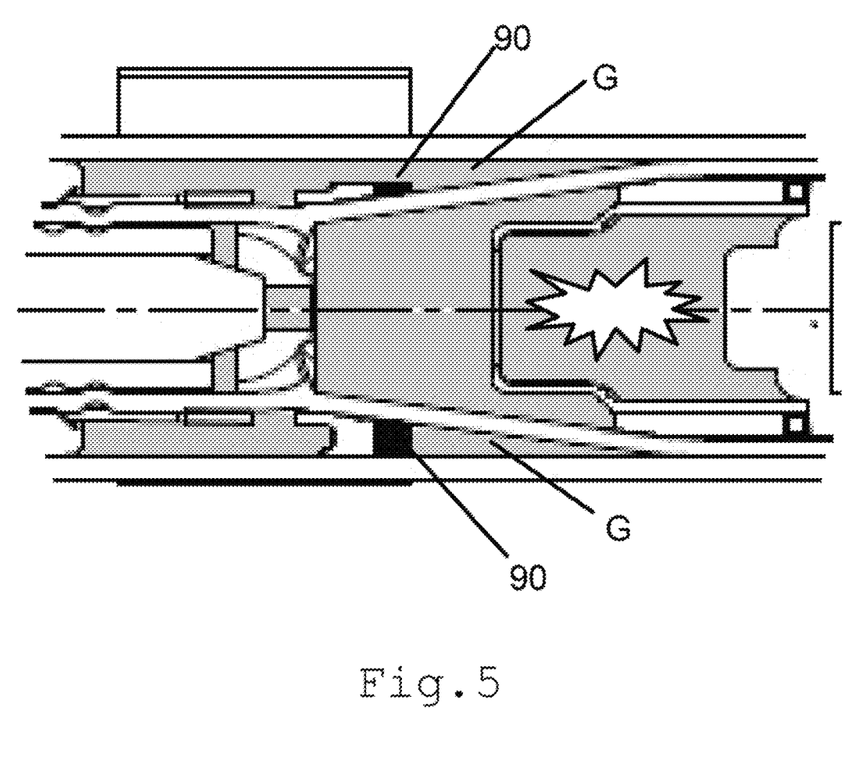
FIG. 5 shows the piston in the state according to FIG. 4 in more detail.

FIG. 5 shows the state of the tensioner drive 11 according to FIG. 4 once again in the enlarged illustration and in more detail. The destroyed first sealing element 90 here can be more readily seen than in FIG. 4. It can be advantageous for the first sealing element 90 to be provided with a predetermined breaking point.

Figure 6:
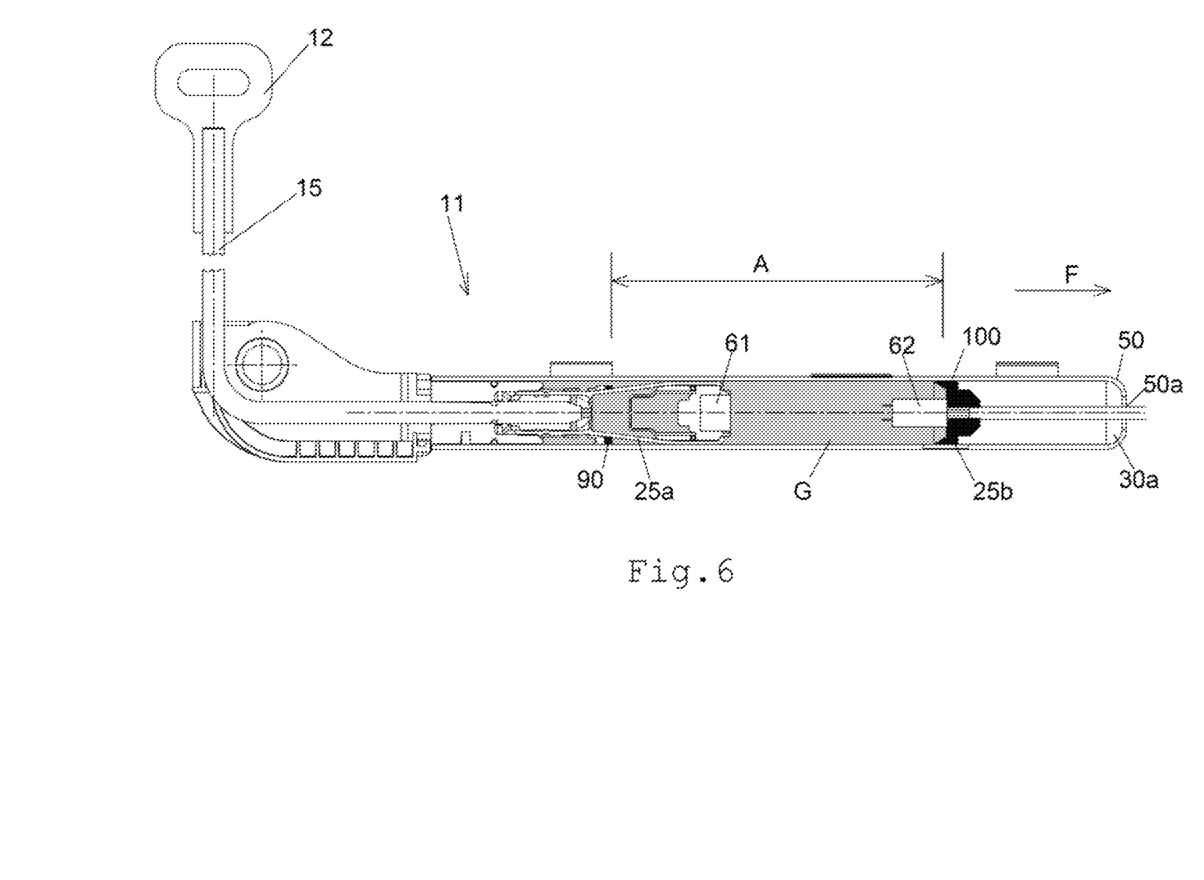
FIG. 6 shows the piston in the case of a fault, once a second piston part has separated from a first piston part of the piston.

FIG. 6 shows the tensioner drive 11 according to FIGS. 4 and 5 at a later point in time. It can be seen that the propulsion gas G, which on account of the destruction of the first sealing element 90 now acts on the second sealing element 100, solely push-starts the second piston part 25*b*; the first piston part 25*a* remains stationary because of the blocked second cable end 15*a*. On account of the propulsion force F of the propulsion gas G, the second piston part 25*b*, which in the exemplary embodiment according to FIG. 6 is formed by the second sealing element 100 and the plug 62, is thus solely moved in the direction of the detent 50. The plug 62 has been separated from the socket 61 on account of the movement of the second piston part 25*b*. The separation of the second piston part 25*b* from the first piston part 25*a* can however also take place only once the piston 25 has already travelled part of the maximum possible distance.

By virtue of the sealing effect of the second sealing element 100 exiting of the propulsion gas G at the tube end 30*a*, or through the opening 50*a* in the detent 50 is avoided or at least significantly reduced in comparison to a piston 25 without a corresponding second sealing element 100, depending on the sealing effect of the second sealing element 100.

It can moreover be readily seen in FIG. 6 that the spacing A between the first piston part 25*a* and the second piston part 25*b*, or between the two sealing elements 90 and 100, respectively, has been significantly increased by virtue of the relative movement of the second sealing element 100 in relation to the first sealing element 90.

Figure 7:
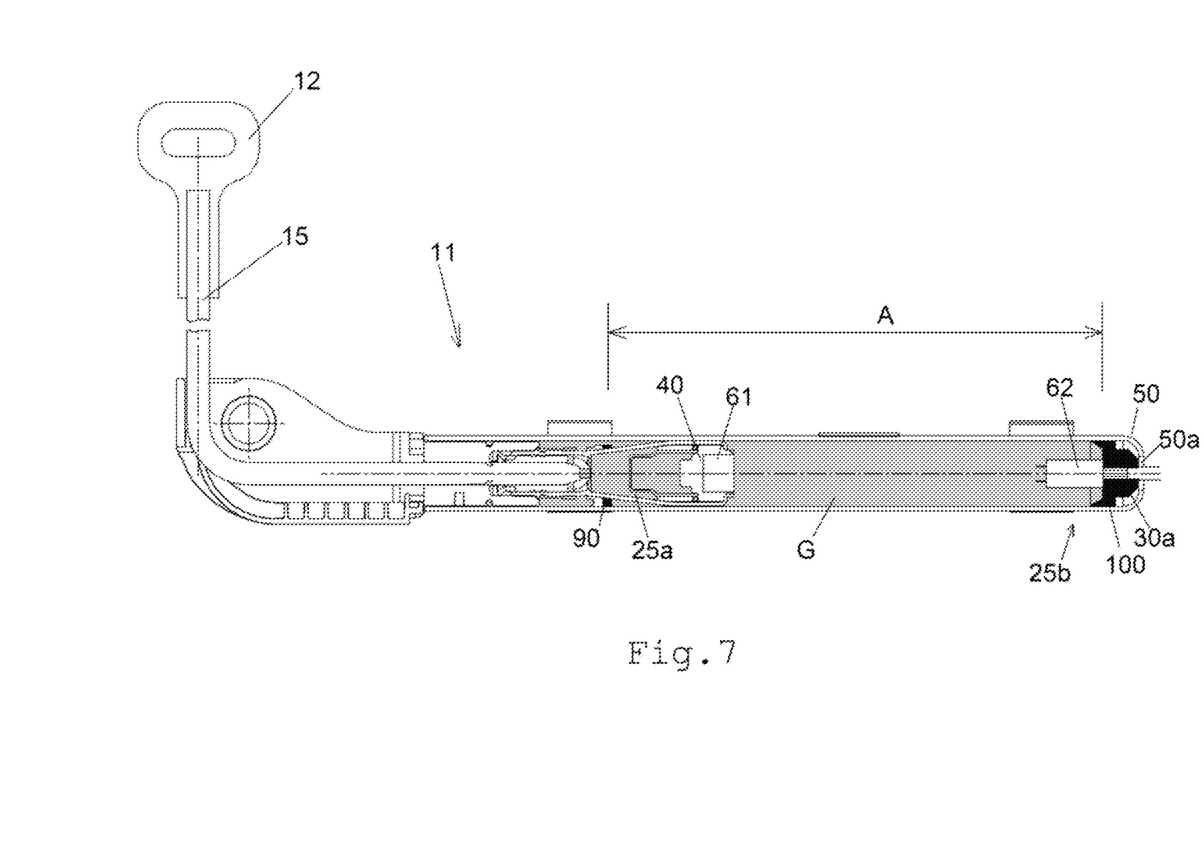
FIG. 7 shows the piston in the case of a fault, with the second piston part in a terminal position.

FIG. 7 shows the tensioner drive 11 according to FIGS. 4 to 6 in the final state. The second piston part 25*b* and the second sealing element 100 have reached the detent 50. By virtue of the sealing effect of the second sealing element 100 the propulsion gas G of the gas generator 40 remains in the tube 30, thus does not exit from the tube 30, or at least not to any relevant extent.

In the exemplary embodiment according to FIGS. 4 to 7 it has been assumed in an exemplary manner that no movement of the first piston part 25*a* arises at all by virtue of a blockage of the traction cable 15, such that the spacing A between the two piston parts 25*a* and 25*b* in the final state shown in FIG. 7 corresponds to the original spacing A between the two sealing elements 90 and 100 and to the displacement path of the second piston part 25*b* in the tube 30.

Figure 8:
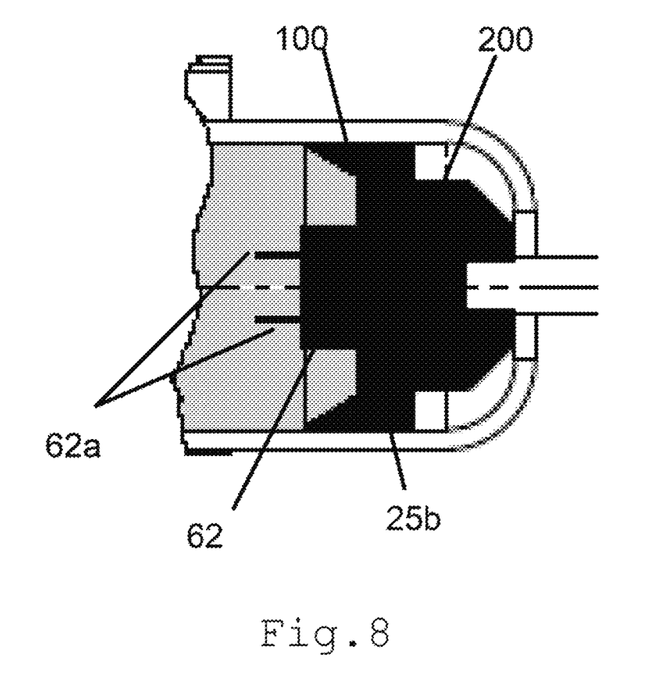
FIGS. 8-9 show in each case variants of embodiment for pistons which are suitable for the tensioner drive according to FIG. 1.

FIG. 8 shows an alternative design embodiment for a second piston part 25*b* which can be used in the tensioner drive 11 according to FIGS. 1 to 7. In the exemplary embodiment according to FIG. 8, the plug 62, with the exception of the electrical plug contacts 62*a* of the plug 62, and the second sealing element 100 are formed by a common element 200 which is preferably composed of an elastically deformable plastics material. Otherwise, the above explanations in the context of FIGS. 1 to 7 apply in analogous manner to the exemplary embodiment according to FIG. 8.

Figure 9:
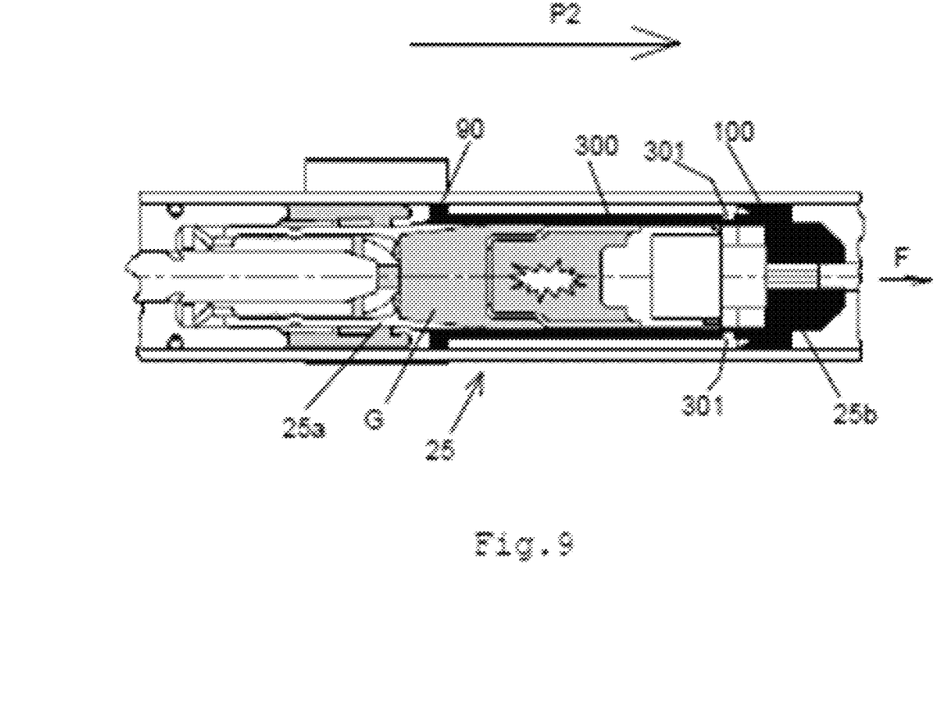

FIG. 9 shows a further exemplary embodiment for a piston 25 which can be used in the tensioner drive 11 according to FIGS. 1 to 7. The piston 25 according to FIG. 9 has a mechanical connection element 300 which is equipped with a predetermined breaking point 301, wherein the provision of the predetermined breaking point 301 may be optional. The connection element 300 in the initial state mechanically connects the two piston parts 25*a* and 25*b* to one another such that a common movement of the two piston parts 25*a* and 25*b* along or counter to the propulsion direction P2 takes place (for example while assembling) as long as the predetermined breaking point 301 remains intact.

Should bursting of the first sealing element 90 arise, the predetermined breaking point 301 will thus also burst and the connection element 301 will lose the connecting effect thereof such that the second sealing element 100 can carry out a relative movement in relation to the first sealing element 90, as has been explained in the context of FIGS. 1 to 7.

In the exemplary embodiment according to FIG. 9 the connection element 300 extends from the first sealing element 90 to the second sealing element 100 and/or per se forms said sealing elements 90, 100; such a design embodiment of the connection element 300 is to be understood to be merely exemplary; alternatively, the connection element 300 can also connect other component parts of the two piston parts 25*a* and 25*b*.

The predetermined breaking point 301 can burst when the propulsion gas G acts on the predetermined breaking point 301. Alternatively or additionally, bursting of the predetermined breaking point 301 can arise when the second sealing element 100, by virtue of the propelling effect of the propulsion gas G, along the propulsion direction P1 is impinged with the propulsion force F and the predetermined breaking point 301 is unable to absorb the propulsion force F.

Figure 10:
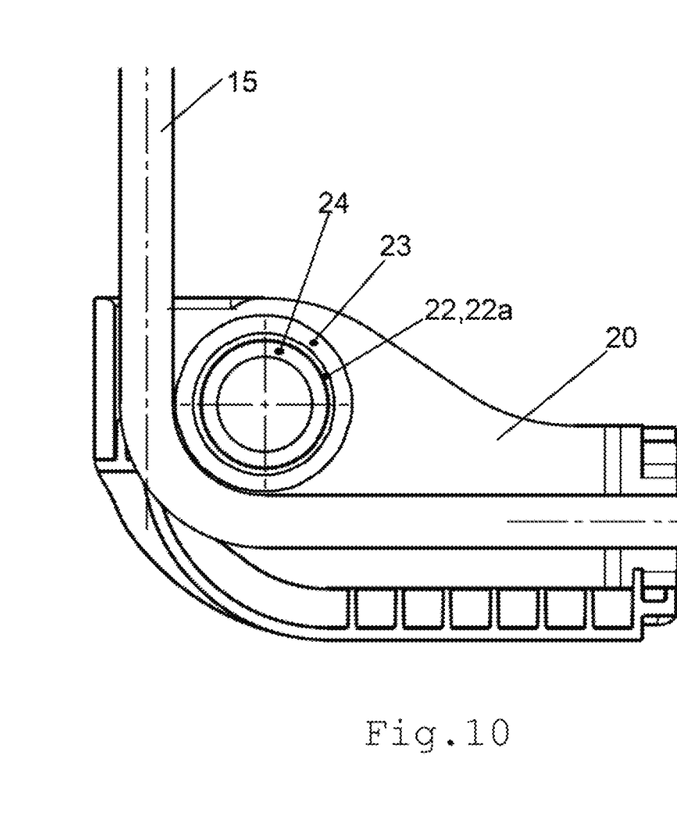
FIG. 10 shows a variant of embodiment for a deflection which is suitable for the tensioner drive according to FIG. 1.

FIG. 10 shows a further exemplary embodiment for a deflection 20 which can be used in the tensioner drive 11 according to FIG. 1. The deflection 20 has a roller 23 which deflects the traction cable 15 and is rotatably mounted by way of a friction bearing bush 22 which is self-lubricating, for example has lubricant 22*a* in the form of a low-friction plastics material incorporated therein. The friction bearing bush 22 is presently supported by a bush 24. Otherwise, the above explanations in the context of FIGS. 1 to 9 apply in analogous manner to the exemplary embodiment according to FIG. 7.

While the invention in detail has been illustrated and described by preferred exemplary embodiments, the invention is not limited by the disclosed examples, and other variations can be derived therefrom by the person skilled in the art without departing from the scope of protection of the invention.

LIST OF REFERENCE SIGNS

10 Assembly
11 Tensioner drive
12 Belt linkage point
15 Traction cable
15*a* First cable end
15*b* Second cable end
20 Deflection
21 Cylindrical appendage
22 Friction bearing bush
22*a* Lubricant
23 Roller
24 Bush
25 Piston
25*a* First piston part
25*b* Second piston part
30 Tube
30*a* Right tube end
31 First tubular portion
32 Second tubular portion
40 Gas generator
41 Igniter
45 Electrical ignition line
50 Detent
50*a* Opening
60 Plug connection
61 Socket
62 Plug
62*a* Electrical plug contacts
70 Housing
80 Clamping piece
90 First sealing element
91 Mechanical support element
100 Second sealing element
110 Chamber
200 Element
300 Mechanical connection element
301 Predetermined breaking point
A Spacing
F Propulsion force/Tensioning force
G Propulsion gas
P1 Direction of arrow
P2 Direction of arrow/propulsion direction
P3 Direction of arrow

The invention claimed is:

1. A tensioner drive (11) for a seatbelt installation, having a tube (30), at least one piston (25) which within the tube (30) is displaceable along a propulsion direction (P2), and a gas generator (40) for generating a propulsion gas (G) and a propulsion pressure on a pressure-facing side of the at least one piston (25), wherein
the at least one piston (25) on the pressure-facing side thereof has a first sealing element (90) which, upon triggering the gas generator (40), is impinged with the propulsion pressure and seals a first tubular portion (31) of the tube (30) that is filled with propulsion gas (G) in relation to a second tubular portion (32) of the tube (30) that in the propulsion direction (P2) lies behind said first tubular portion (31);
a second sealing element (100) which, upon triggering the gas generator (40), is separated from the propulsion gas (G) of the gas generator (40) by the first sealing element (90) disposed in the propulsion direction (P2) behind the first sealing element (90);
wherein the second sealing element (100) is displaceable relative to the first sealing element (90), and when a leakage of the first sealing element (90) occurs and when impinged with pressure by the propulsion gas (G) is displaced along the propulsion direction (P2) while enlarging a spacing (A) between the first sealing element (90) and the second sealing element (100);
the at least one piston (25) is in at least two parts and, when viewed in the propulsion direction (P2), has a front first piston part (25a) and, when viewed in the propulsion direction (P2), has a second piston part (25b) that lies behind said first piston part (25a);
the first sealing element (90) is attached to the first piston part (25a), and the second sealing element (100) is attached to the second piston part (25b);
the second piston part (25b), when viewed in the propulsion direction (P2), is able to be moved away from the first piston part (25a) when the first piston part (25a) is blocked or decelerated in terms of the movement thereof and the second sealing element (100) is impinged with the propulsion pressure of the propulsion gas (G)
the first piston part (25a) and the second piston part (25b) in an initial state, prior to the triggering of the gas generator (40), are connected by means of a plug connection (60); and
the plug connection (60) is released when the second piston part (25b) is moved away from the first piston part (25a) while the second sealing element (100) is impinged with pressure.

2. The tensioner drive (11) as claimed in claim 1, wherein
the first sealing element (90) is designed to leak when a predefined pressure limit is exceeded due to a blocked movement of the at least one piston; and
upon the leakage of the first sealing element (90), the propulsion gas (G) acts on the second sealing element (100) and, independently of any further movement of the first sealing element (90), displaces said second sealing element (100) in a direction of the tube end (30a) of the tube (30).

3. The tensioner drive (11) as claimed in claim 2, wherein upon the leakage of the first sealing element (90), the second sealing element (100) seals the first tubular portion (31) of the tube (30) in relation to the second tubular portion (32) of the tube (30) either in a gas-tight manner or a manner that at least reduces the gas flow.

4. The tensioner drive (11) as claimed in claim 1, wherein an electrical ignition line (45) for electrically triggering the gas generator (40) is disposed in the second tubular portion (32), and through a tube opening (50a) at a tube end (30a) of the tube (30) extends to the second piston part (25b).

5. The tensioner drive (11) as claimed in claim 4, wherein the electrical ignition line (45) in a movement of the second piston part (25b) is pushed by the second piston part through the tube opening (50a).

6. The tensioner drive (11) as claimed in claim 1, wherein the plug connection (60) is an electrical plug connection (60) which electrically connects the ignition line (45) to the gas generator (40).

7. The tensioner drive (11) as claimed in claim 1, wherein the gas generator (40) is disposed in the first piston part (25a) and is moved conjointly with the first piston part.

8. The tensioner drive (11) as claimed in claim 1, wherein the tensioner drive (11) has a traction cable (15) which is connected to the first piston part (25a) and which in a movement of the first piston part (25a) is pulled into the first tubular portion (31) and causes a tensioning force (F).

9. The tensioner drive (11) as claimed in claim 1, wherein the tensioner drive (11) is a linear tensioner.

10. The tensioner drive (11) as claimed in claim 1, wherein the first sealing element (90) is equipped with at least one predetermined breaking point.

11. The tensioner drive (11) as claimed in claim 1, wherein
the first sealing element (90) and the second sealing element (100) are formed by a single-part connection element (300) which has at least one predetermined breaking point (301) between the first sealing element (90) and the second sealing element (100);
wherein the connection element (300) in an initial state mechanically connects the first piston part (25a) and the second piston part to one another such that a conjoint movement of the connected piston parts takes place as long as the predetermined breaking point (301) remains intact; and
wherein the connection element (300), upon the predetermined breaking point (301) bursting, loses the connecting effect thereof and permits the relative movement between the first sealing element (90) and the second sealing element (100).

12. The tensioner drive (11) as claimed in claim 1, wherein a deflection (20) of the tensioner drive (11) has a roller (23) which is preferably mounted so as to be rotatable by way of a friction bearing bush (22) and deflects a traction cable (15).

13. An assembly (10) having a tensioner drive (11) and a belt linkage point (12), in particular comprising a belt deflection installation or a belt fastening point, wherein the tensioner drive (11) is a tensioner drive (11) as claimed in claim 1.

14. The assembly as claimed in claim 13, wherein a traction cable (15) of the tensioner drive (11) in a movement of the at least one piston (25) pulls the belt linkage point (12) in a direction of the tensioner drive (11).

15. The tensioner drive (11) as claimed in claim 1, wherein
the tensioner drive (11) is a linear tensioner; and
the tube (30) is a rectilinear cylinder tube.

16. The tensioner drive (11) as claimed in claim 1, wherein the tube (30) is a rectilinear cylinder tube.

17. A tensioner drive for a seatbelt installation, having a tube, at least one piston which within the tube is displaceable along a propulsion direction, and a gas generator for generating a propulsion gas and a propulsion pressure on a pressure-facing side of the at least one piston,
wherein
the at least one piston on the pressure-facing side thereof has a first sealing element which, upon triggering the gas generator, is impinged with the propulsion pressure and seals a first tubular portion of the tube that is filled with propulsion gas in relation to a second tubular portion of the tube that in the propulsion direction lies behind said first tubular portion;

a second sealing element which, upon triggering the gas generator, is separated from the propulsion gas of the gas generator by the first sealing element disposed in the propulsion direction behind the first sealing element;

wherein the second sealing element is displaceable relative to the first sealing element, and when a leakage of the first sealing element occurs and when impinged with pressure by the propulsion gas is displaced along the propulsion direction while enlarging a spacing between the first sealing element and the second sealing element;

the at least one piston is in at least two parts and, when viewed in the propulsion direction, has a front first piston part and, when viewed in the propulsion direction, has a second piston part that lies behind said first piston part;

the first sealing element is attached to the first piston part, and the second sealing element is attached to the second piston part;

the second piston part, when viewed in the propulsion direction, is able to be moved away from the first piston part when the first piston part is blocked or decelerated in terms of the movement thereof and the second sealing element is impinged with the propulsion pressure of the propulsion gas; and the gas generator is disposed in the first piston part and is moved conjointly with the first piston part the first piston part and the second piston part in an initial state, prior to the triggering of the gas generator, are connected by means of a plug connection which establishes an electrical connection between the gas generator and an electrical ignition line; and the plug connection is released when the second piston part is moved away from the first piston part while the second sealing element is impinged with pressure.

\* \* \* \* \*